(12) United States Patent
Cheung

(10) Patent No.: US 7,398,978 B2
(45) Date of Patent: *Jul. 15, 2008

(54) FOLDABLE TROLLY

(76) Inventor: Maggie Cheung, Block B2, 6/F, Tsing Yi Industrial Centre, Phase 1, Tsing Yi, N.T. (Hong Kong) (CN)

( * ) Notice: Subject to any disclaimer, the term of this patent is extended or adjusted under 35 U.S.C. 154(b) by 0 days.

This patent is subject to a terminal disclaimer.

(21) Appl. No.: 11/699,636

(22) Filed: Jan. 29, 2007

(65) Prior Publication Data

US 2007/0187913 A1    Aug. 16, 2007

Related U.S. Application Data

(63) Continuation-in-part of application No. 10/985,086, filed on Nov. 9, 2004, now Pat. No. 7,213,817.

(51) Int. Cl.
*G06F 1/16* (2006.01)

(52) U.S. Cl. .................. 280/42; 280/639; 280/651; 280/47.35; 280/79.3

(58) Field of Classification Search .............. 280/42, 280/639, 651, 47.35, 79.3
See application file for complete search history.

(56) References Cited

U.S. PATENT DOCUMENTS

| | | | | |
|---|---|---|---|---|
| 1,180,294 | A * | 4/1916 | Hunter | 220/7 |
| 4,523,768 | A * | 6/1985 | Dlubala | 280/42 |
| 6,079,777 | A * | 6/2000 | Simmons et al. | 297/217.1 |
| 6,213,494 | B1 * | 4/2001 | Liaw | 280/651 |
| 6,851,564 | B2 * | 2/2005 | Ng | 211/149 |
| 7,213,817 | B2 * | 5/2007 | Cheung | 280/42 |

* cited by examiner

*Primary Examiner*—Christopher Ellis
*Assistant Examiner*—Cynthia F. Collado

(57) ABSTRACT

The present invention provides a foldable, four-wheel trolley of simple, lightweight construction for use in connection with the transport and storage of items of the type typically used in connection with the operation of beauty salons or similar uses. Moreover, the trolley is easily foldable from an expanded, operating configuration into a compact, folded configuration easy to store and transport when not in use. The trolley has a recessed top tray that is removably connected to the foldable trolley frame, and a plurality of storage drawers are slidably mounted within the foldable trolley frame at locations beneath the top tray and supports for hair dryers.

14 Claims, 15 Drawing Sheets

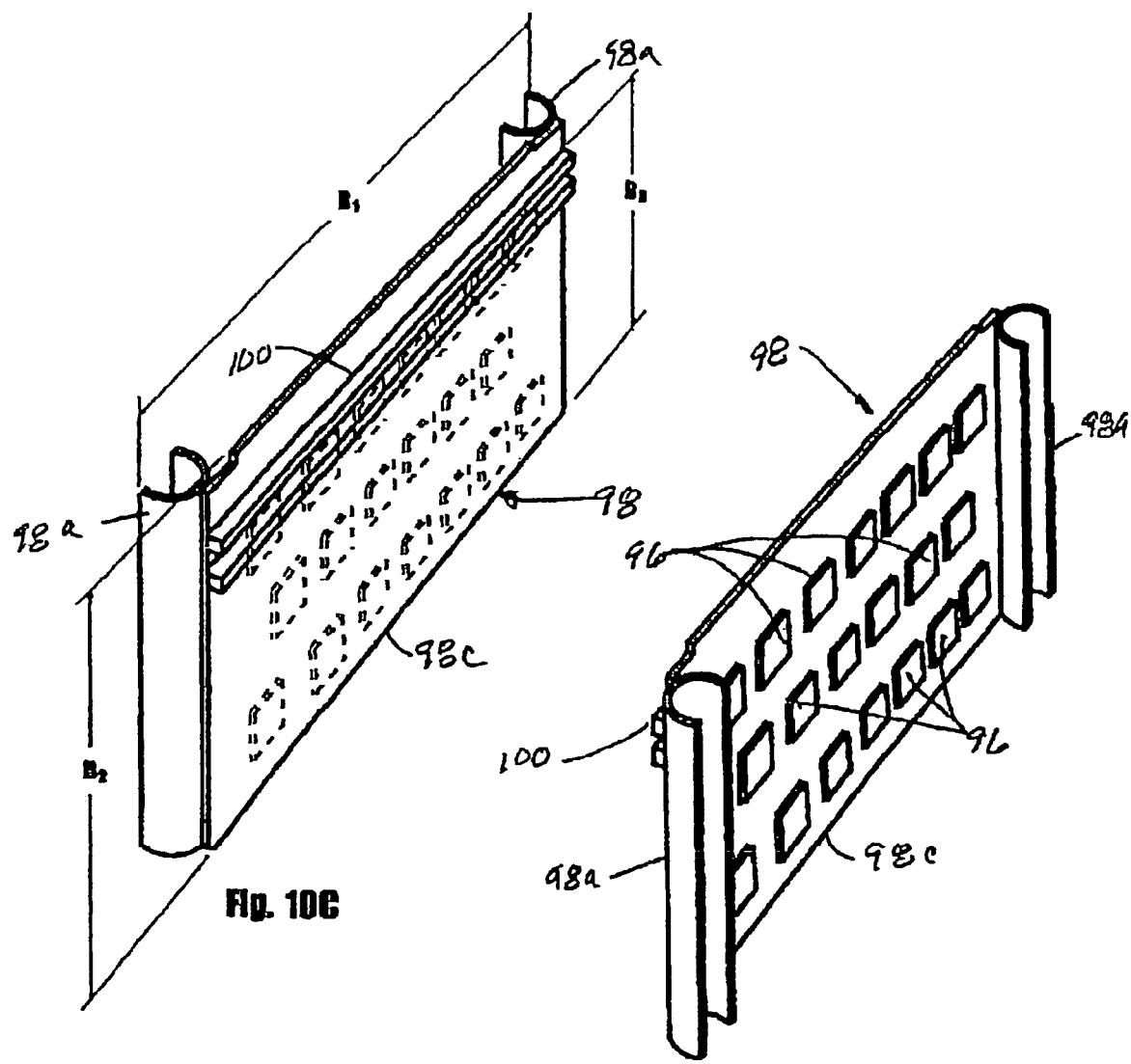

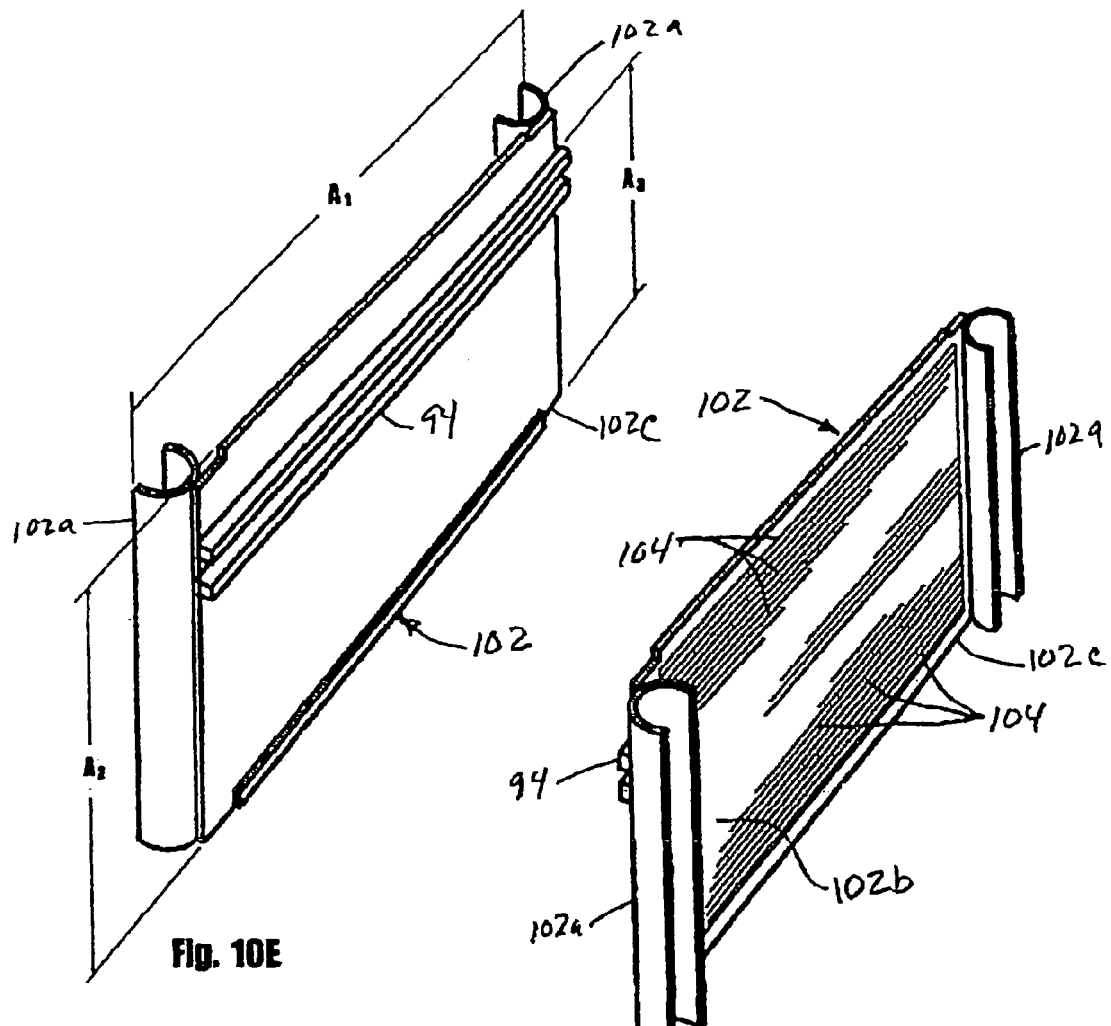

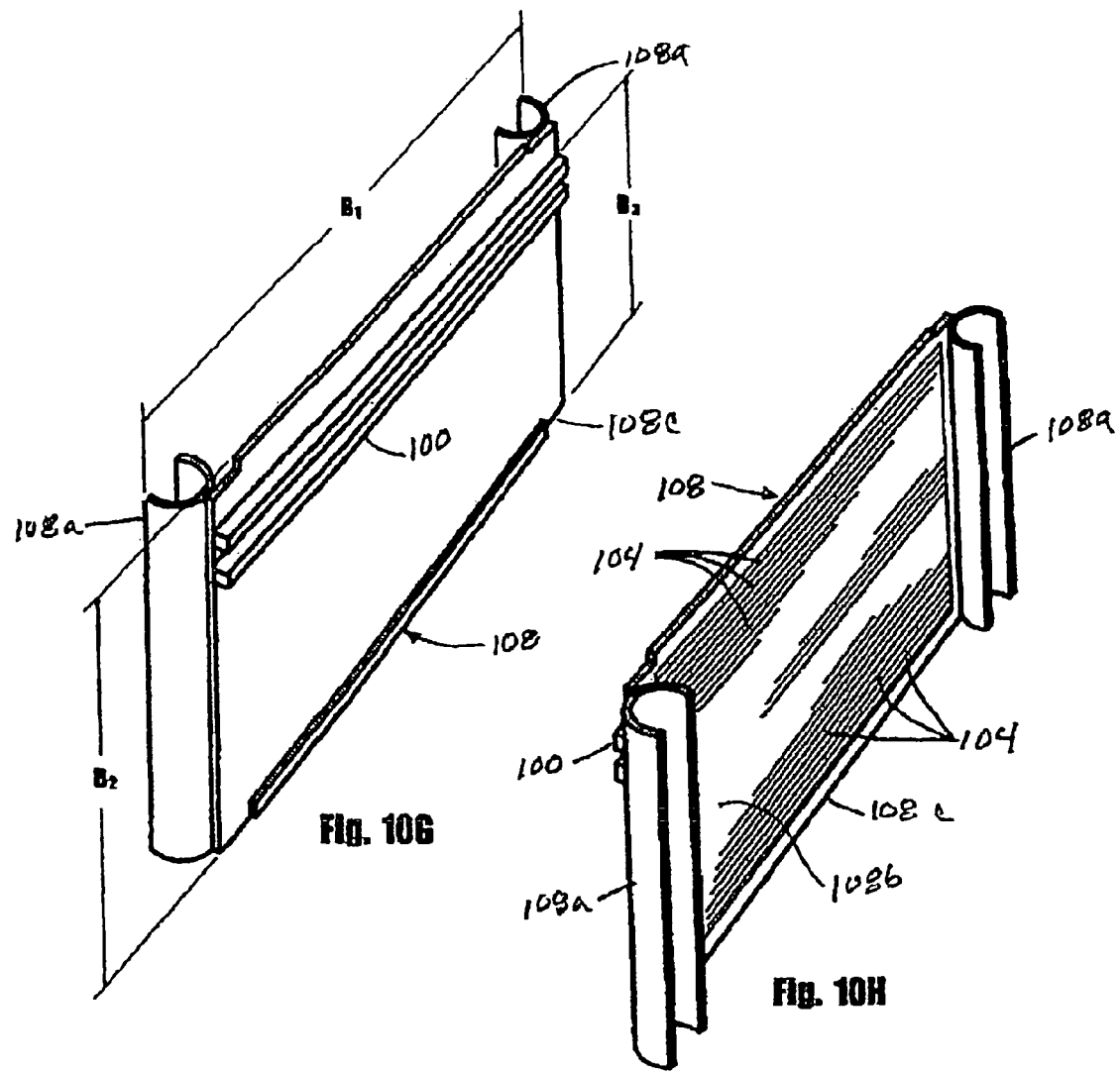

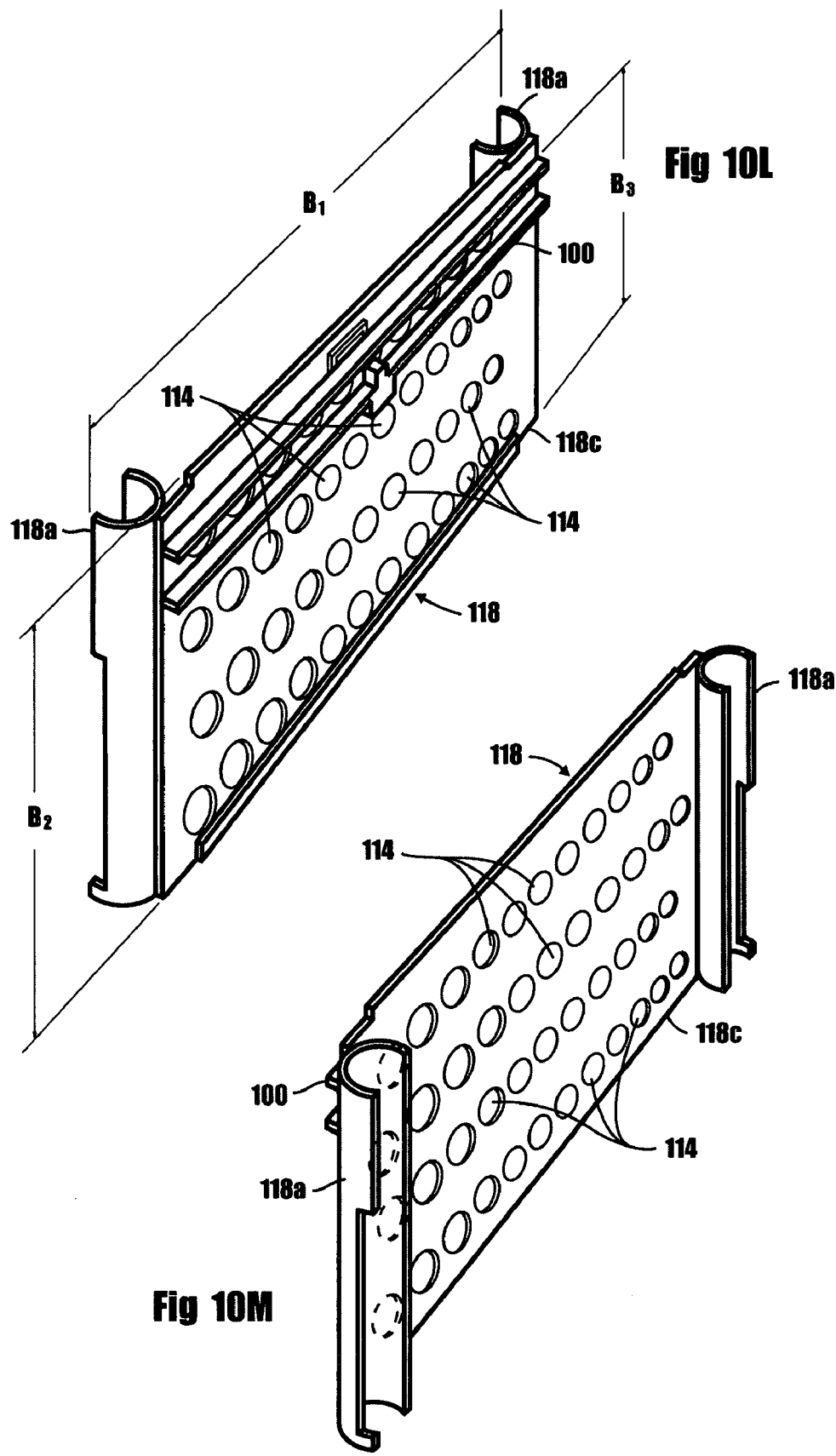

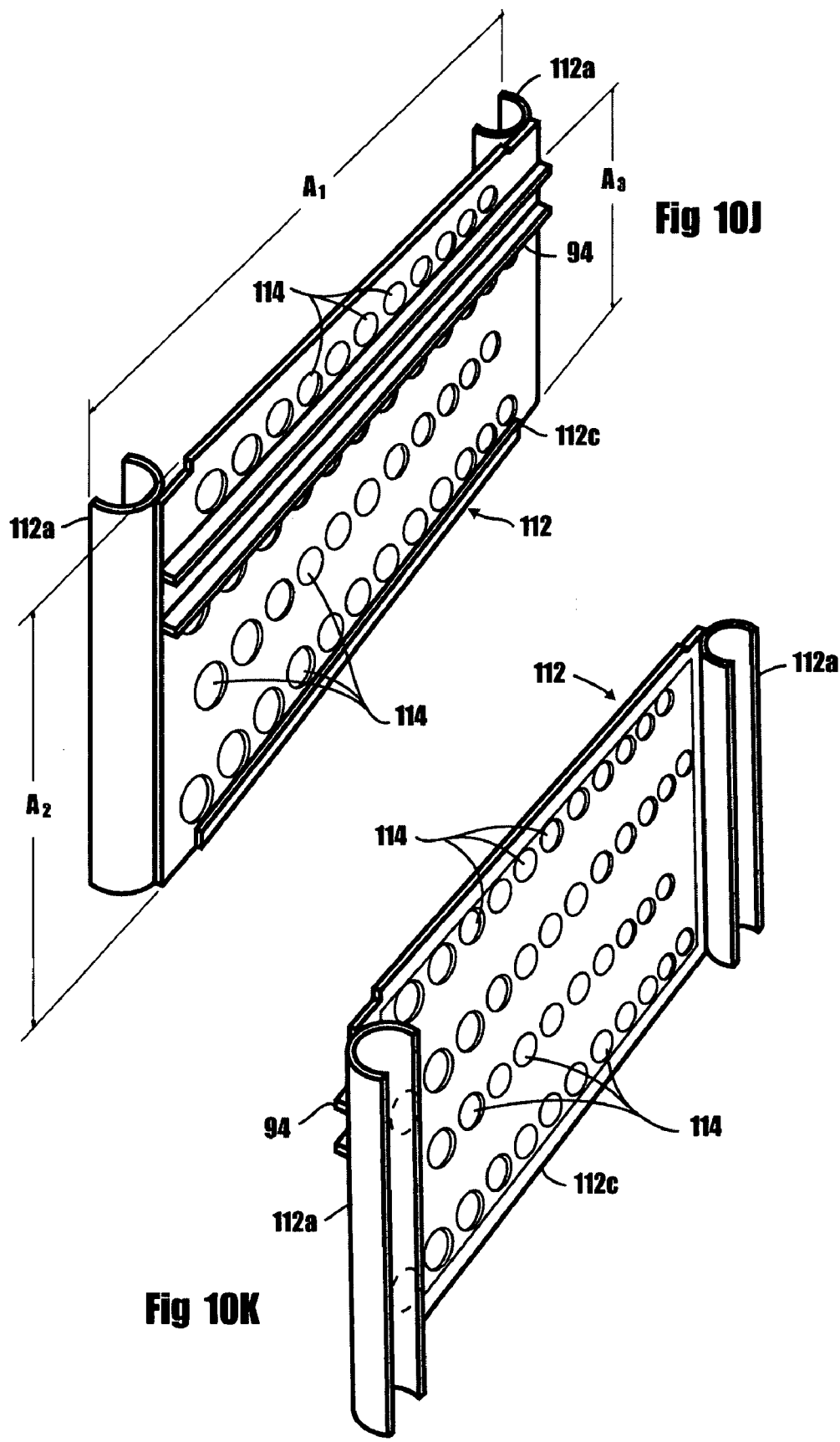

FOLDABLE TROLLY

This is a Continuation-in-Part of application Ser. No. 10/985,086 filed Nov. 9, 2004 now U.S. Pat. No. 7,213,817.

BACKGROUND OF THE INVENTION

1. Field of the Invention

The present invention relates generally to portable trolleys or carts. More particularly, the invention concerns a foldable, wheeled trolley for use in connection with the transport of items in a beauty salon.

2. Discussion of the Prior Art

A large number of different types of wheeled trolleys or carts have been suggested in the past. For example, wheeled carts have long been used in convenience and grocery stores to transport items throughout the store. Similarly, wheeled carts are frequently used in garages and manufacturing facilities to hold and transport tools and various kinds of parts used in the conduct of the business.

As a general rule, the prior art wheeled carts are of a sturdy, heavy-duty, bulky construction making them difficult and expensive to transport in commerce. Accordingly, prior art wheeled carts are typically disassembled for shipment and then are reassembled at the location of use. Because of the complexity of construction of many of the prior art wheeled carts, assembly of the carts at the point of use can be difficult and time-consuming.

A primary object of the present invention is to provide a lightweight, four-wheeled trolley or cart of simple, lightweight construction for use primarily in beauty salons. Advantageously, the trolley is capable of being folded for a substantial reduction in size and shape making it easy to store when not in use and permitting it to be easily and inexpensively shipped in commerce. However, when the trolley is assembled into an operating configuration, it is quite stable and because of its unique design is capable of conveniently carrying a wide variety of tools and supplies of the character typically used in the operation of a beauty salon. More particularly, the trolley is provided with a readily accessible, recessed top tray for conveniently carrying small tools and supplies and a plurality of light-weight drawers slidably carried within the trolley frame below the top tray for carrying and storing larger tools and supplies. Additionally, in one form of the invention, readily accessible, side-mounted tool racks are pivotally connected to the top tray. When not in use these tool racks can be pivoted into a downward location proximate the sidewalls of the trolley frame to enable the trolley to be used in confined spaces.

SUMMARY OF THE INVENTION

It is an object of the present invention to provide a foldable, four-wheel trolley of a simple, lightweight construction for use in connection with the transport and storage of items of the type typically used in connection with the operation of beauty salons.

It is another object of the invention to provide a trolley of the aforementioned character which can be easily folded from an expanded, operating configuration into a compact, folded configuration making it easy to store and transport when not in use.

Another object of the invention is to provide a trolley as described in the preceding paragraphs which, when assembled into an operating configuration, is strong, stable, easily maneuverable and convenient to use. More particularly, it is an object of the invention to provide such a trolley, which includes a readily accessible, recessed top tray that is removably connected to the foldable trolley frame and a plurality of storage drawers slidably mounted within the foldable trolley frame at locations beneath the top tray.

Another object of the invention is to provide a four-wheeled trolley of the class described, which includes conveniently located, side-mounted supports for supporting hair dryers and other types of tools commonly used in the conduct of beauty salon operations.

By way of brief summary, one form of the foldable, four-wheel trolley of the present invention comprises a supporting structure which includes first and second spaced-apart, generally parallel, upright side frames, each having an upper portion and a lower portion. A plurality of casters are rotatably connected to the lower portion of each of the first and second side frames. A plurality of foldable link assemblies foldably interconnect the first and second side frames to permit movement of the side frames between a first operating position and a second folded position. The foldable link assemblies each comprise first and second pivotally connected links, the first link being pivotally connected to the first side frame and the second link being pivotally connected to second side frame. A top member is removably connected to upper portions of the first and second side frames of the supporting structure when the side frames are in the first operating position and a plurality of drawers disposed between and slidably interconnected with the first and second side frames when the side frames are in the first operating position. Each of the drawers is slidably movable between a first retracted position and a second extended position relative to the supporting structure.

BRIEF DESCRIPTION OF THE DRAWINGS

FIG. 10C is a rear view of still another form of side panel of the invention that includes a differently positioned drawer guide rails that are adapted to slidably support the storage means of the invention for storing various articles.

FIG. 10D is a front view of the alternate form of side panel shown in FIG. 10C.

FIG. 10E is a rear view of yet another form of side panel of the invention that includes drawer guide rails that are adapted to slidably support the storage means of the invention for storing various articles.

FIG. 10F is a front view of the alternate form of side panel shown in FIG. 10E.

FIG. 10G is a rear view of still another form of side panel of the invention that includes differently positioned drawer guide rails that are adapted to slidably support the storage means of the invention for storing various articles.

FIG. 10H is a front view of the alternate form of side panel shown in FIG. 10C.

FIG. 10J is a rear view of an yet another form of side panel of the invention that includes drawer guide rails that are adapted to slidably support the storage means of the invention for storing various articles.

FIG. 10K is a front view of the alternate form of side panel shown in FIG. 10J.

FIG. 10L is a rear view of still another form of side panel of the invention that includes differently positioned drawer guide rails that are adapted to slidably support the storage means of the invention for storing various articles.

FIG. 10M is a front view of the alternate form of side panel shown in FIG. 10L.

DESCRIPTION OF THE INVENTION

Figure 1:
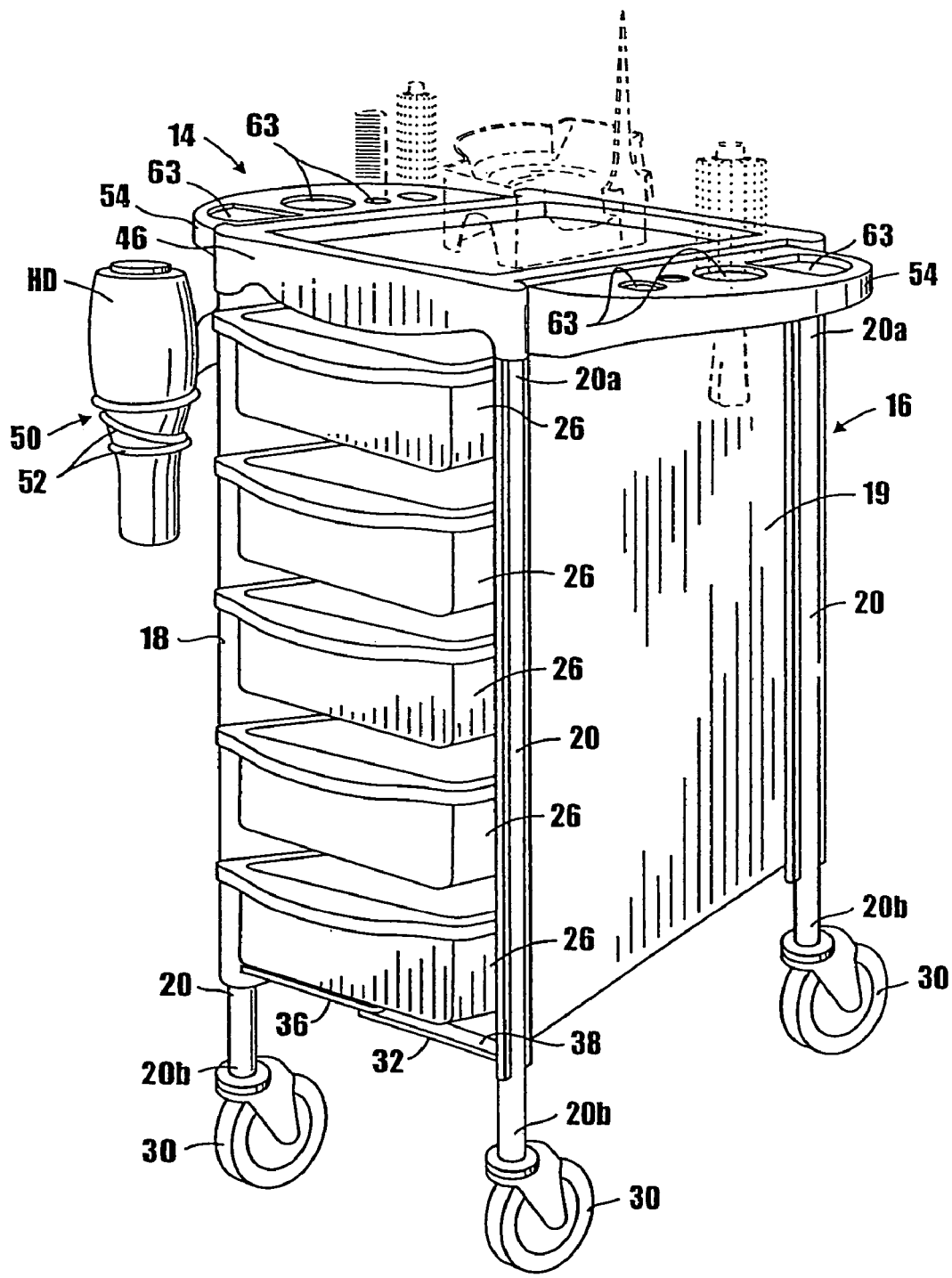
FIG. 1 is a generally perspective view of one form of the foldable trolley of the present invention.
Figure 2:
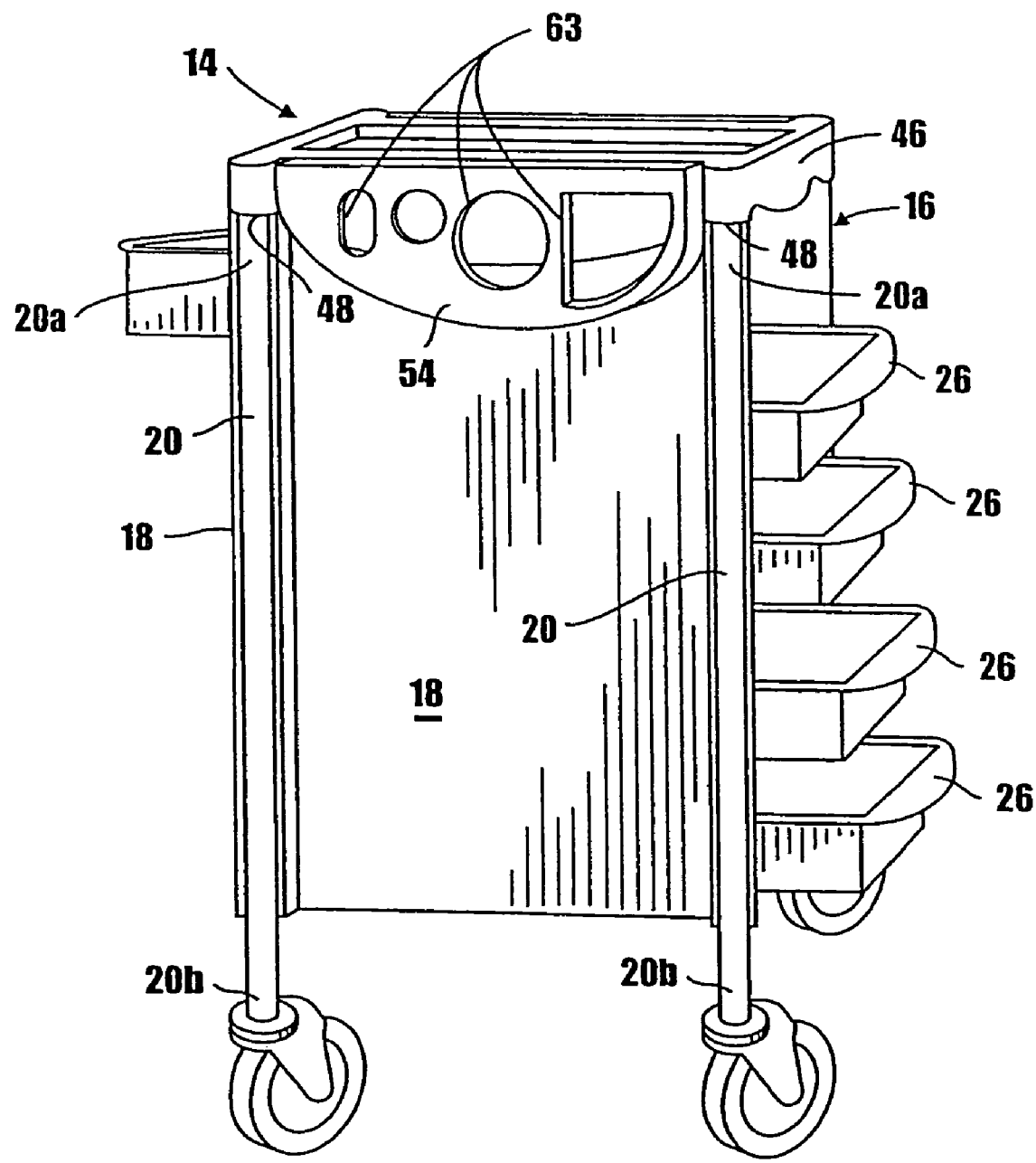
FIG. 2 is a side view of one form of the foldable trolley of the present invention showing the tool holder component of the apparatus folded downwardly and the drawers moved into an outward position.
Figure 3:
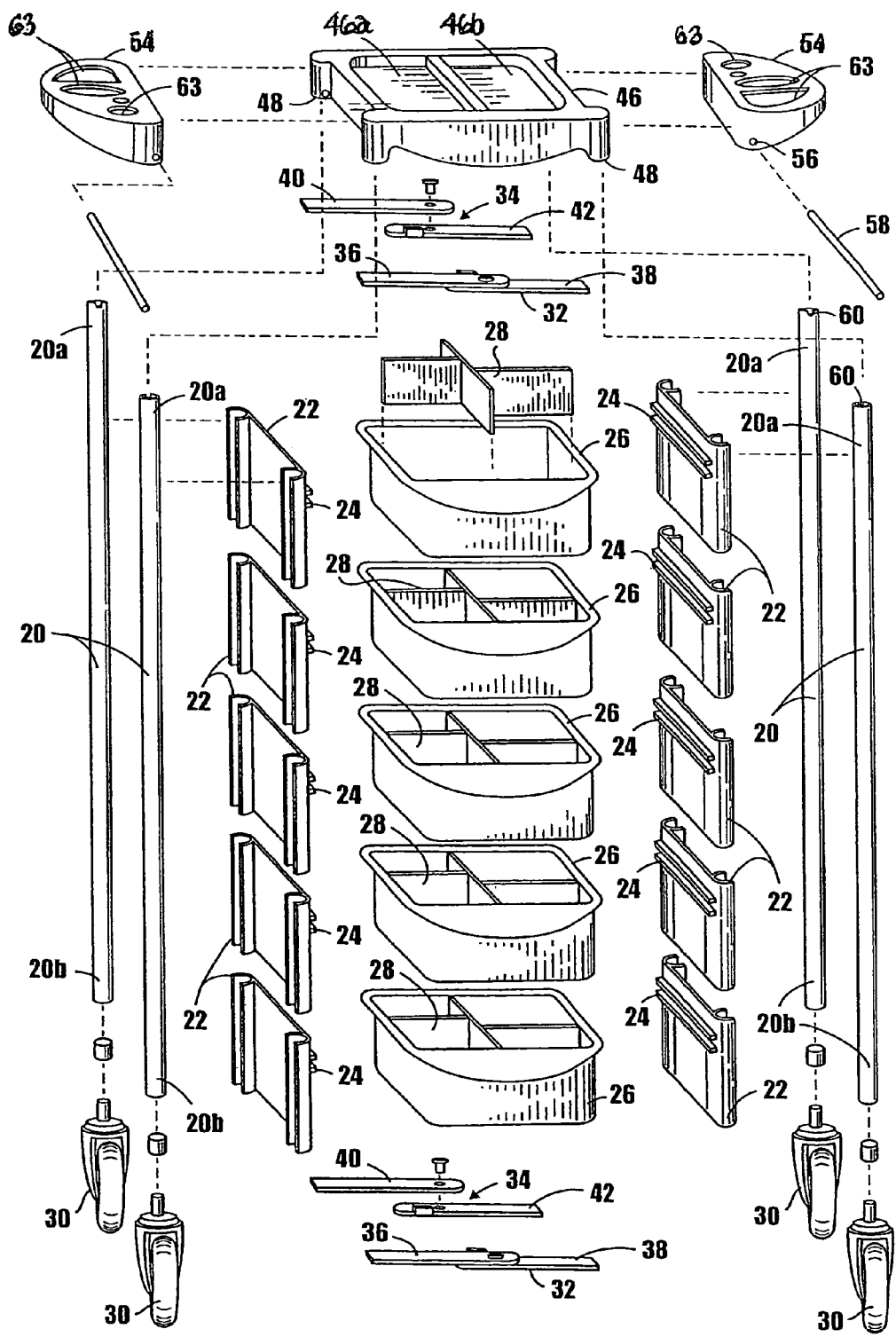
FIG. 3 is a generally perspective, exploded view of the foldable trolley shown in FIG. 1 of the drawings.

Referring to the drawings and particularly to FIGS. 1, 2 and 3, one form of the foldable trolley of the present invention is there shown generally designated by the numeral 14. The foldable trolley of this form of the invention, which is specially designed for use in beauty salons for transporting articles from place to place, comprises a supporting structure 16 which includes first and second spaced-apart, generally parallel, substantially upright first and second side frames 18 and 19. Each side frame has an upper portion and a lower portion and each includes a pair of longitudinally spaced-apart, generally parallel tubular columns 20 (FIG. 3). Each of the columns 20 has an upper extremity 20a and a lower extremity 20b. A plurality of vertically spaced, generally horizontally extending side panels 22 are connected to tubular columns 20 in the manner illustrated in FIG. 3. Connected to each of the side panels 22 are guide means, here provided as drawer guide rails 24, which are adapted to slidably support the storage means of the invention for storing various articles. The storage means is here provided as a plurality of storage trays or drawers of the configuration shown in the drawings as 26. As illustrated in FIG. 3 storage trays 26 include partition assemblies 28 which function to divide the trays into a plurality of article storage compartments.

To enable the foldable trolley to be conveniently moved about within the beauty salon, a conventional, readily commercially available caster assembly 30 is rotatably connected to the lower extremity 20b of each of the tubular columns 20 of the first and second side frames 18 and 19 (See FIG. 1).

Figure 4:
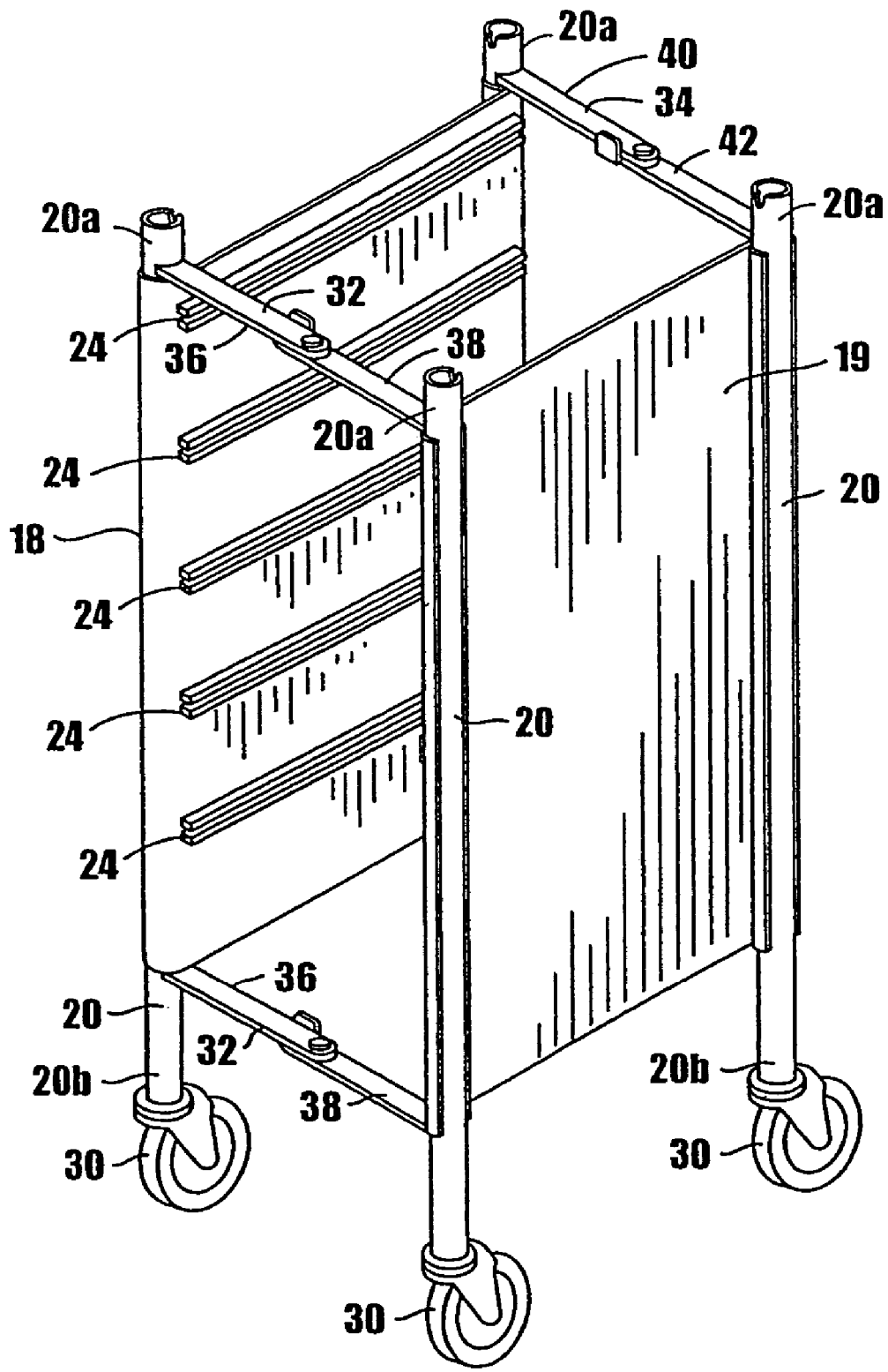
FIG. 4 is a generally perspective fragmentary view of one form of the supporting frame of the foldable trolley of the invention.
Figure 5:
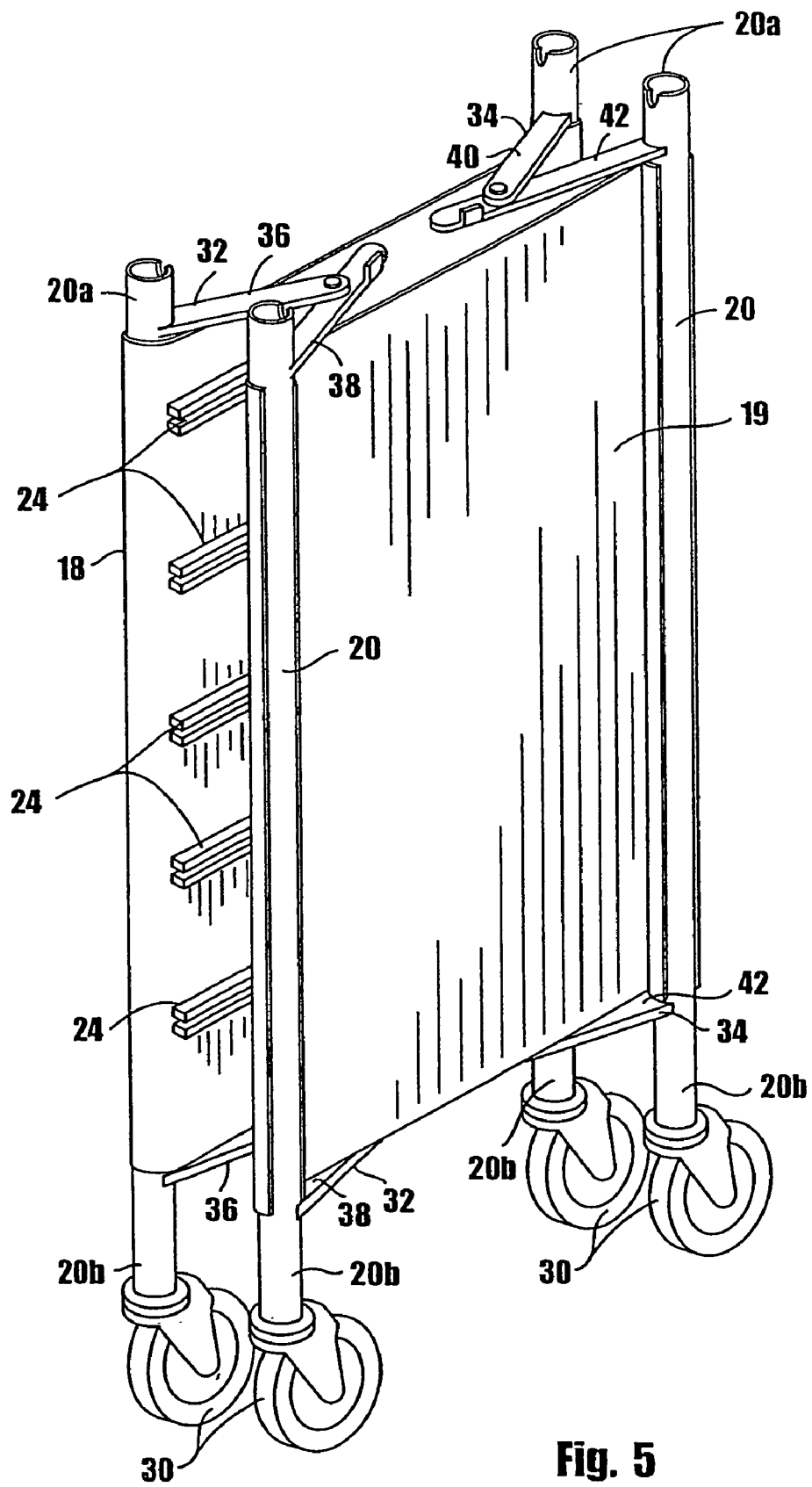
FIG. 5 is a generally perspective, fragmentary view similar to FIG. 4, but showing the supporting frame of the trolley in a folded configuration.

In order to enable the supporting frames of the apparatus to be folded from the first operating configuration shown in FIG. 4 to the second folded configuration shown in FIG. 5, a pair of front, or first, foldable link assemblies 32 are connected to the front columns of the supporting frame and a pair of rear, or second, foldable link assemblies 34 are connected to the rear columns of the supporting frame. As best seen in FIG. 4, each of the first foldable link assemblies 32 comprise first and second pivotally connected links 36 and 38 respectively, while each of the second foldable link assemblies 34 comprise third and fourth pivotally interconnected links 40 and 42 respectively. First links 36 of each of the first link assemblies is pivotally connected to one of the columns 20 of the first side frame 18 and second links 38 of each of the first link assemblies is pivotally connected to one of the columns 20 of the second side frame 19. In similar fashion, third links 40 of each of the second link assemblies 34 are pivotally connected to first side frame 18 and fourth links 42 of each of the second link assemblies are connected to one of the columns 20 of the second side frame 19. Links 36 and 38 of each of the first link assemblies 32 are pivotally interconnected at their distal ends and links 40 and 42 of each of the second link assemblies 34 are pivotally interconnected at their distal ends so as to enable the link assemblies to fold from the operating configuration shown in FIG. 4 into the folded configuration shown in FIG. 5.

When the support structure 16 of the apparatus is in the operating configuration shown in FIG. 4, a molded plastic top member 46 is removably connected to the upper portions 20a of the columns 20 of first and second side frames of the supporting structure in the manner shown in FIGS. 1 and 2. As best seen in FIG. 3, molded plastic top member 46 has first and second article receiving recesses 46a and 46b for receiving various types of equipment and supplies of the character illustrated in phantom lines in FIG. 1. Top member 46 is also provided with a plurality of spaced-apart sockets 48 which are constructed and are arranged proximate each corner of top member 46 to closely, telescopically receive the upper extremities of the tubular columns 20 of the first and second side frames 18 and 19.

As indicated in FIGS. 1 and 2, the plurality of drawers 26 are disposed between the first and second side frames 18 and 19 of the supporting structure 16 when the side frames are in the first operating position shown in FIGS. 1 and 2. As illustrated in FIG. 2, the drawers 26 are slidable along guide rails 24 between a first retracted position and a second extended position to gain access to the articles contained within the drawers.

As is also illustrated in FIG. 1, the foldable trolley of the invention also includes hair dryer support means connected to a selected one of the tubular columns 20 of one of the first and second side frames for removably supporting a hair dryer HD. This hair dryer support means here comprises a support member 50 that is constructed from a plurality of coils of heavy wire 52, the proximal end of which is interconnected by any appropriate means to one of the supporting columns 20.

Also forming an important feature of the foldable trolley apparatus of the invention is a pair of oppositely disposed article support members 54 which extend from and are pivotally interconnected with the spaced-apart, parallel columns 20 which form a part of the each of the side structures 18 and 19 of the supporting structure 16. More particularly, as best seen in FIG. 3, each of the support members 54 is provided with a bore 56 which closely receives a pivot bar 58, the ends of which are received within slots 60 formed in the top portions 20a of the columns 20. With this construction, each of the article support members 54 can be pivoted from the position shown in FIG. 1 to the folded position shown in FIG. 2. As indicated in FIGS. 1 and 2, each of the article support members 54 is provided with a plurality of apertures 63 of various shapes that are adapted to removably receive brushes and other tools and implements of the character shown by the phantom lines in FIG. 1.

When the foldable trolley of the present invention is in the operating configuration shown in FIG. 1, it may be conveniently rolled about the beauty salon so as to make the beauty equipment and supplies carried thereby readily accessible to the beauty technicians. When the apparatus is to be used in tight locations, one or both of the side members 54 can be pivoted into the lowered position wherein they reside proximate the side panels of the supporting structure. When it is desired to place the trolley in condition for shipment or storage, the trolley can be quickly and easily folded into a compact, folded configuration in the manner described in the paragraphs which follow.

Figure 6:
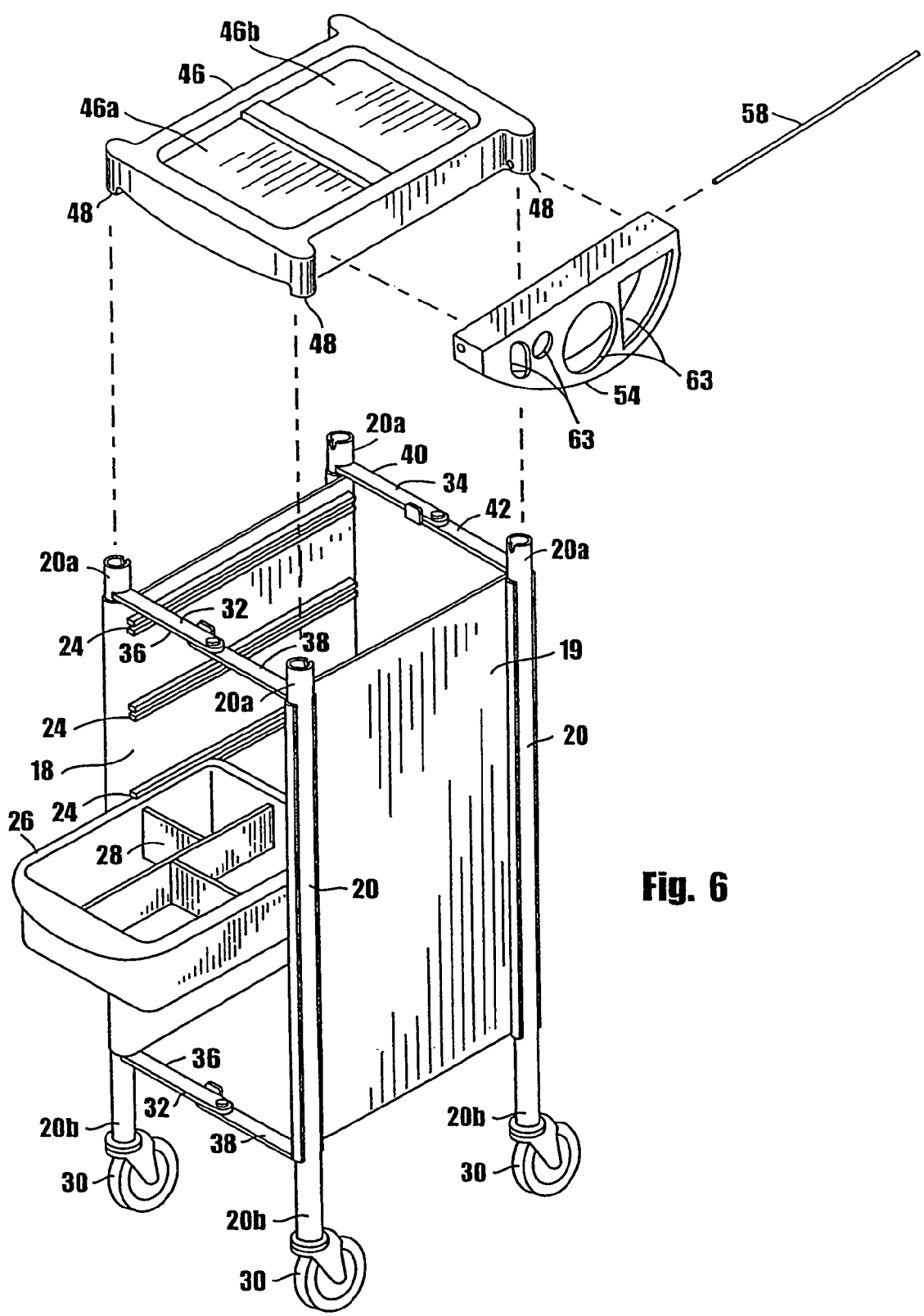
FIG. 6 is a generally perspective fragmentary, exploded view of the supporting frame of the foldable trolley and of certain of the components of the apparatus that are mounted on the supporting frame.
Figure 7:
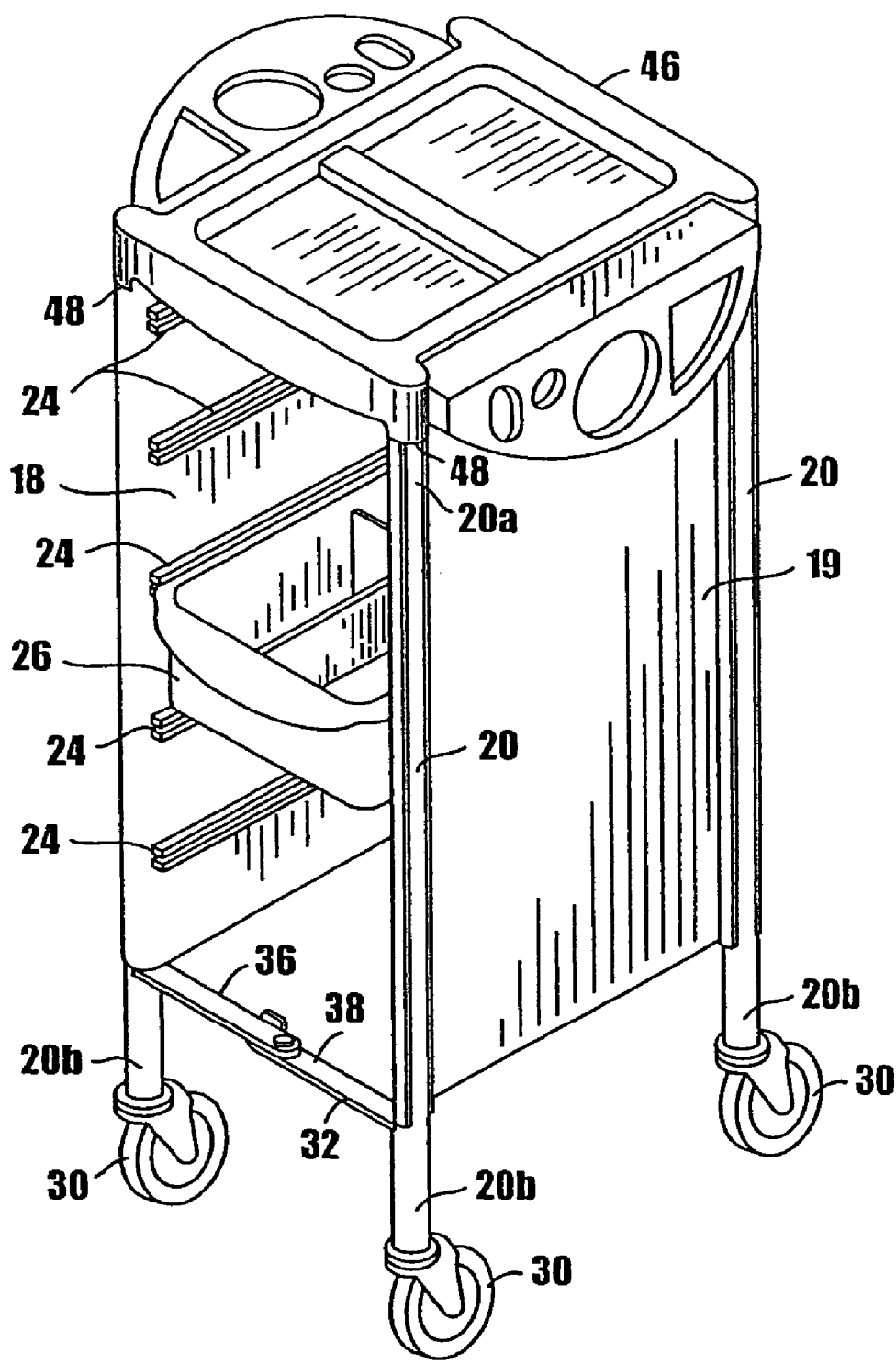
FIG. 7 is a generally perspective view similar to FIG. 6, but showing certain of the components of the apparatus in position on the supporting frame.

After removal of the equipment and supplies that are carried by the top and side members of the trolley, the side members 54 can either be folded into the stored configuration or alternatively they can be disconnected from the top member 46 by simply removing the pivot rods 58 in the manner illustrated in FIG. 6. This done, the top member 46 can be separated from the supporting structure 16 by exerting an upward force on the top member sufficient to separate it from the supporting structure 16 in the manner illustrated in FIG. 6. With the drawers 26 slidably removed from the interior of the supporting structure, the supporting structure can next be conveniently folded from the operating configuration shown in FIG. 4 into the folded configuration illustrated in FIG. 5. This is accomplished by exerting an inward force on the linkage assemblies 32 and 34 proximate their inner pivot point that is sufficient to cause the linkage assemblies to fold inwardly in the manner illustrated in FIG. 5. As the linkage assemblies are folded inwardly sides 18 and 19 move into close proximity thereby substantially minimizing the volume occupied by the support structure 16 for convenience of shipping or storage.

Figure 8:
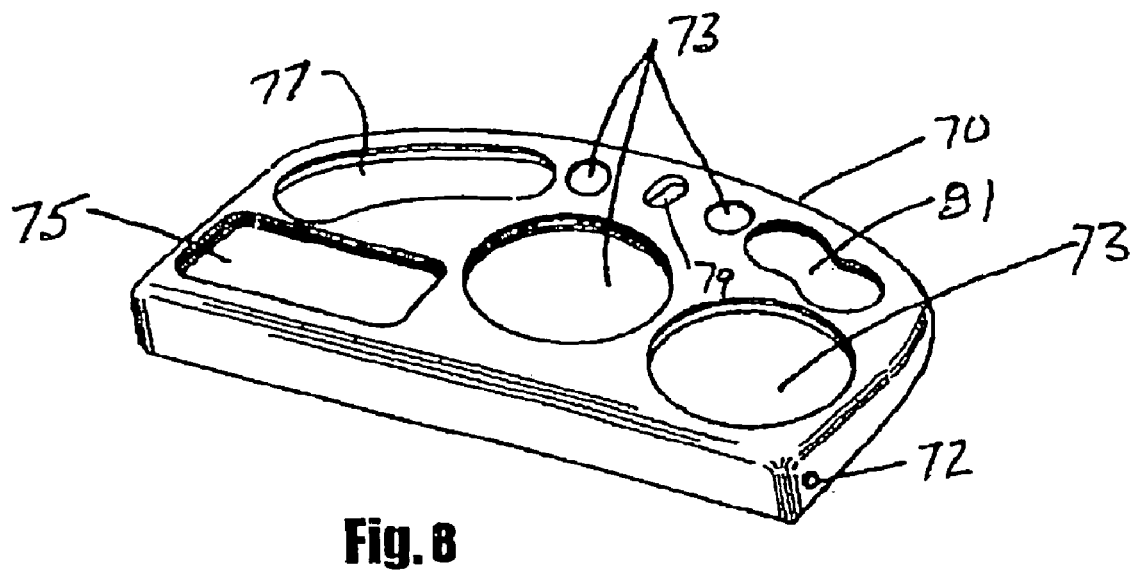
FIG. 8 is a generally perspective view of an alternate form of side member of the apparatus of the invention that can be interconnected with the top member of the apparatus.

Referring now to FIG. 8, an alternate form of article support member of the apparatus of the invention is there shown generally designated by the numeral 70. This alternate form of support member, which can be used in place of the previously described article support members 54, can be pivotally interconnected with the spaced-apart, parallel columns 20 which form a part of the each of the side structures 18 and 19 of the supporting structure 16 (see FIG. 3). As illustrated in FIG. 8, support member 70 is provided with a bore 72 which closely receives a pivot bar, such as pivot bar 58, the ends of which are received within slots 60 formed in the top portions 20a of the columns 20. As also shown in FIG. 8, article support member 70 is somewhat more rectangular in shape than are support members 54 and is provided with a plurality of apertures of various shapes that are adapted to removably receive brushes and other tools and implements of the character shown by the phantom lines in FIG. 1. More particularly, article support member 70 is provided with a plurality of spaced-apart, generally circular-shaped apertures 73, a generally rectangular-shaped aperture 75 and an elongated, generally oval-shaped aperture 77. Article support member 70 is also provided with a smaller, generally oval-shaped aperture 79 and a generally figure-8-shaped aperture 81.

Figure 9:
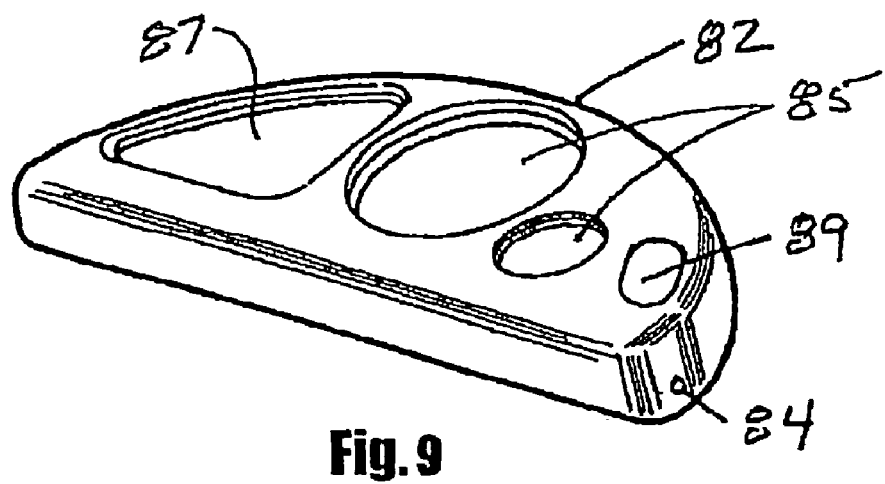
FIG. 9 is a generally perspective view of still another form of side member of the apparatus of the invention that can be interconnected with the top member of the apparatus.

Turning next to FIG. 9, still another form of article support member of the apparatus of the invention is there shown generally designated by the numeral 82. This alternate form of support member, which can also be used in place of the previously described article support members 54, can be pivotally interconnected with the spaced-apart, parallel columns 20 which form a part of the each of the side structures 18 and 19 of the supporting structure 16 (see FIG. 3). As illustrated in FIG. 8, support member 82 is provided with a bore 84 which closely receives a pivot bar, such as pivot bar 58, the ends of which are received within slots 60 formed in the top portions 20a of the columns 20. As also shown in FIG. 9, article support member 82, while being generally oval-shaped like support member 54, is provided with a fewer number of article receiving apertures than the support member illustrated in FIG. 8. More particularly, article support member 82 is provided with a pair of spaced-apart, generally circular-shaped apertures 85, a generally triangular-shaped aperture 87 and a generally oval-shaped aperture 89.

Figures 10A, 10B:
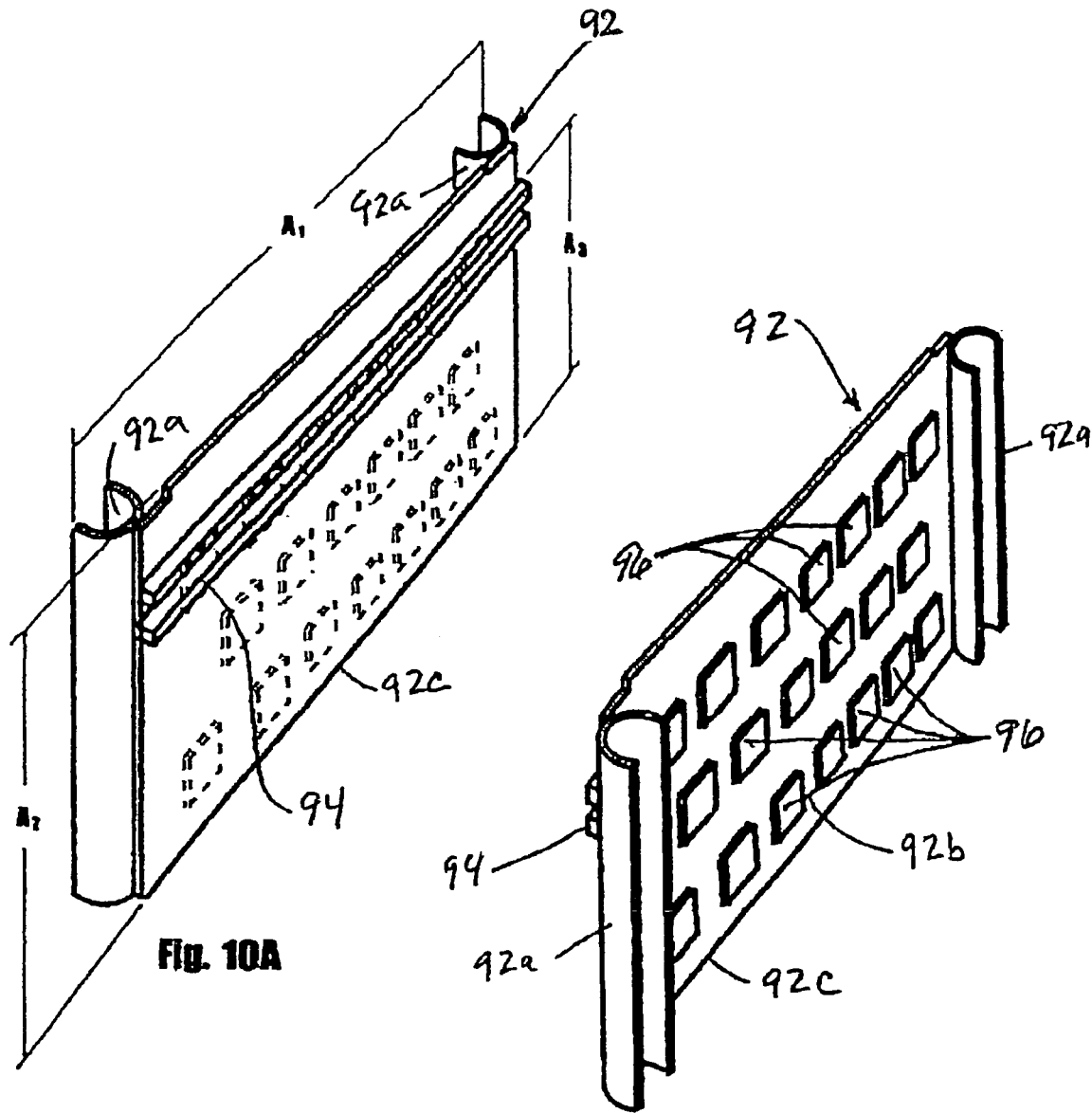
FIG. 10A is a rear view of an alternate form of side panel of the invention that includes drawer guide rails that are adapted to slidably support the storage means of the invention for storing various articles.
FIG. 10B is a front view of the alternate form of side panel shown in FIG. 10A.
Figure 11:
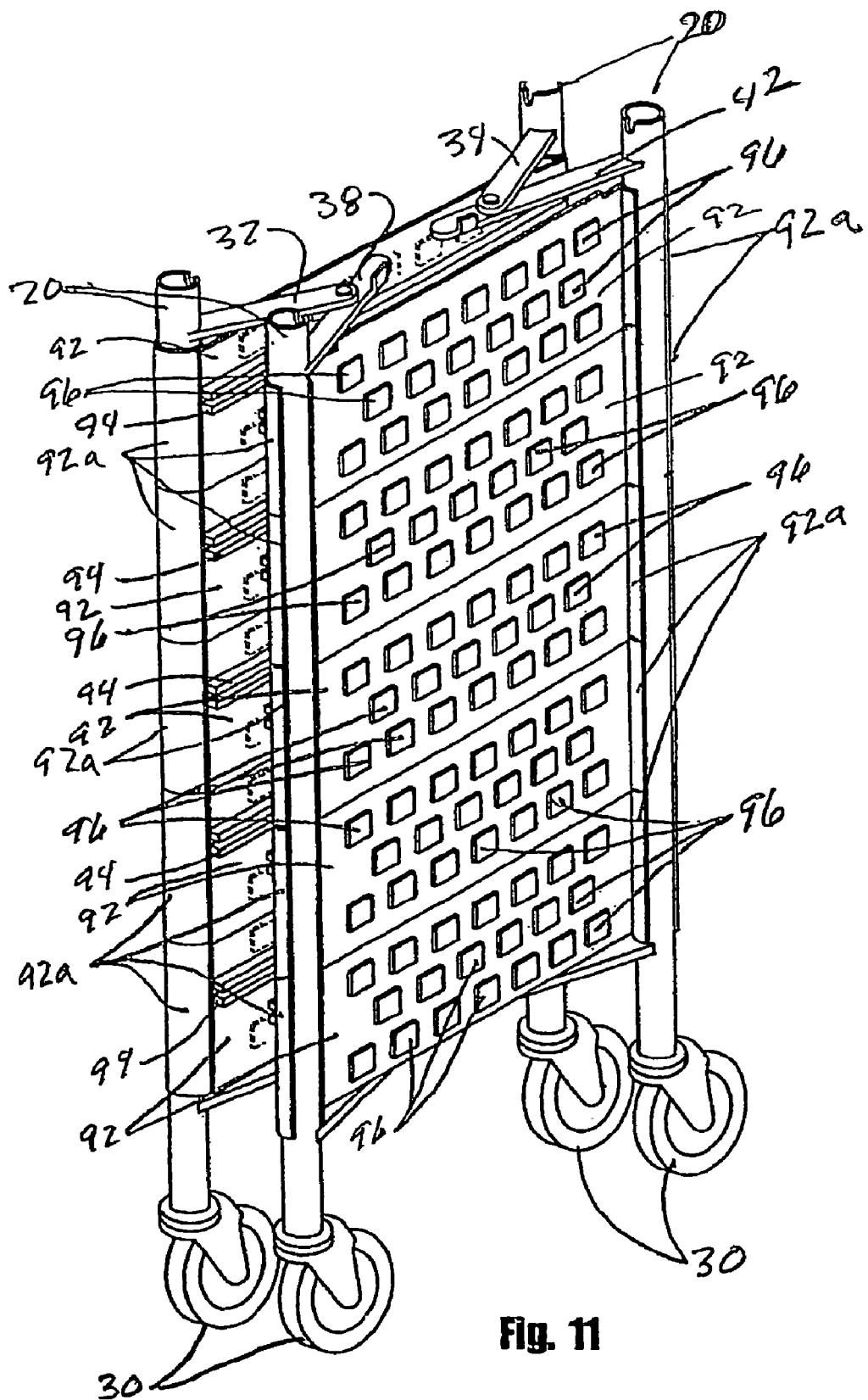
FIG. 11 is a generally perspective, fragmentary view showing the supporting frame of an alternate form of foldable trolley of the invention in a folded configuration.

Referring next to FIGS. 10A and 10B, an alternate form of side panel of the apparatus is there shown and generally designated by the numeral 92. Side panel 92, which can be used in place of the previously identified side panels 22, is provided at either end with generally "C"-shaped connectors 92a that can be used to connect the panel to tubular columns 20 in the manner illustrated in FIGS. 3 and 11. As best seen in FIG. 10A, side panel 92 is also provided with a drawer guide rail 94, that is adapted to slidably support the previously defined storage means of the invention, or storage drawers, such as drawers 26 (see FIG. 3). As best seen in FIG. 10B, side panel 92 includes a side wall 92b that is provided with the decorative indicia, shown here as comprising a multiplicity of spaced-apart, generally rectangular-shaped, decorative protruberances 96. When a plurality of vertically spaced side panels 92 are interconnected with columns 20 (see FIG. 11), the decorative protruberances 96 provide an attractive and distinctive appearance to the apparatus of the invention. As indicated in FIG. 10A, side panel 92 has a first width A-1 and a first height A-2. In this alternate form of the invention, the drawer guide rail 94 is spaced-apart from the bottom, or lower surface 92c of the panel by a first distance A-3.

Turning next to FIGS. 10C and 10D, still another form of side panel of the apparatus is there shown and generally designated by the numeral 98. Side panel 98 is similar in most respects to side panel 92 and like numerals are used in FIGS. 10C and 10D to identify like components. The primary difference between side panel 98 and side panel 96 resides in the different location of the drawer guide rail 100. Side panel 98, which can also be used in place of the previously identified side panels 22, is provided at either end with generally "C"-shaped connectors 98a that can be used to connect the panel to tubular columns 20 in the manner illustrated in FIG. 3. As best seen in FIG. 10C, side panel 98 is also provided with a drawer guide rail 100, that is adapted to sidably support the previously defined storage means of the invention, or storage drawers, such as drawers 26 (see FIG. 3). In this alternate form of the invention, the drawer guide rail 100 is spaced-apart from the bottom, or lower surface 98c of the panel by a second distance B-3, which distances greater than first distance A-3.

Turning now to FIGS. 10E and 10F, still another form of side panel of the apparatus of the invention is there shown and generally designated by the numeral 102. Side panel 102 is similar in many respects to side panel 92 and like numerals are used in FIGS. 10E and 10F to identify like components. The primary difference between side panel 102 and side panel 92 resides in the differently configured outer surface, or side wall 102b of the side panel. As before side panel 102, which can be used in place of the previously identified side panels 22, is provided at either end with generally "C"-shaped connectors 102a that can be used to connect the panel to tubular columns 20 in the manner illustrated in FIG. 3. As best seen in FIG. 10E, side panel 102 is also provided with a drawer guide rail 94 that is identical in configuration, location and operation to that of side panel 92. As depicted in FIG. 10B, side wall 102b, rather then being provided with decorative indicia in the form of a multiplicity of spaced-apart, generally rectangular-shaped, decorative protuberances 96, is provided with a multiplicity of horizontally extending, decorative striations 104. When a plurality of vertically spaced side panels 102 are interconnected with columns 20 (see FIG. 3), the decorative striations 104 provide an attractive and somewhat different distinctive appearance to the apparatus of the invention. As indicated in FIG. 10E, side panel 102 has a first width A-1 and a first height A-2. As was the case with side panel 92, the drawer guide rail 94 is spaced-apart from the bottom, or lower surface 102c of the panel by a first distance A-3.

Turning next to FIGS. 10G and 10H, yet another form of side panel of the apparatus is there shown and generally designated by the numeral 108. Side panel 108 is similar in most respects to side panel 98 and like numerals are used in FIGS. 10G and 10H to identify like components. As before side panel 108, which can be used in place of the previously identified side panels 22, is provided at either end with generally "C"-shaped connectors 108a that can be used to connect the panel to tubular columns 20 in the manner illustrated in FIG. 3. As best seen in FIG. 10G, side panel 108 is also provided with a drawer guide rail 100, that is identical in configuration, location and operation to that of side panel 98. As depicted in FIG. 10H, side wall 108b of panel 108 rather than being provided with a multiplicity of spaced-apart, generally rectangular-shaped, decorative protuberances 96 is provided with a multiplicity of horizontally extending, decorative striations 104. When a plurality of vertically spaced side panels 108 are interconnected with columns 20 (see FIG. 3), the decorative indicia, or striations 104 provide an attractive appearance to the apparatus of the invention. As indicated in FIG. 10G, side panel 108 has a first width B-1 and a first height B-2. As was the case with side panel 98, the drawer guide rail 100 is spaced-apart from the bottom 108c of the panel by a second distance B-3.

Turning next to FIGS. 10J and 10K, still another form of side panel of the apparatus of the invention is there shown and generally designated by the numeral 112. Side panel 112 is also similar in many respects to side panel 92 and like numerals are used in FIGS. 10J and 10K to identify like components. The primary difference between side panel 112 and side panel 92 resides in the differently configured outer surface of the side panel. As before, side panel 112, which can be used in place of the previously identified side panels 22, is provided at either end with generally "C"-shaped connectors 112a that can be used to connect the panel to tubular columns 20 in the manner illustrated in FIG. 3. As best seen in FIG. 10J, side panel 112 is also provided with a drawer guide rail 94 that is identical in configuration, location and operation to that of side panel 92. As depicted in FIG. 10J, side wall 112b of panel 112 rather then being provided with a multiplicity of spaced-apart, generally rectangular-shaped, decorative protuberances 96 is provided with decorative indicia in the form of a multiplicity of spaced-apart, generally circular-shaped apertures 114. When a plurality of vertically spaced side panels 112 are interconnected with columns 20 (see FIG. 3), the apertures 114 provide an attractive and somewhat different distinctive appearance to the apparatus of the invention. As indicated in FIG. 10J, side panel 112 has a first width A-1 and a first height A-2. As was the case with side panel 92, the drawer guide rail 94 is spaced-apart from the bottom 112c of the panel by a first distance A-3.

Turning next to FIGS. 10L and 10M, yet another form of side panel of the apparatus is there shown and generally designated by the numeral 118. Side panel 118 is similar in most respects to side panel 98 and like numerals are used in FIGS. 10L and 10M to identify like components. The primary difference between side panel 118 and side panel 98 resides in the differently configured outer surface of the side panel. As before side panel 118, which can be used in place of the previously identified side panels 22, is provided at either end with generally "C"-shaped connectors 118a that can be used to connect the panel to tubular columns 20 in the manner illustrated in FIG. 3. As best seen in FIG. 10L, side panel 118 is also provided with a drawer guide rail 100, that is identical in configuration, location and operation to that of side panel 98. As depicted in FIG. 10M, side panel 118 rather then being provided with a multiplicity of spaced-apart, generally rectangular-shaped, decorative protuberances 96 is provided with decorative indicia in the form of a multiplicity of spaced-apart, generally circular-shaped apertures 114. When a plurality of vertically spaced side panels 118 are interconnected with columns 20 (see FIG. 3), the spaced-apart, generally circular-shaped apertures 114 provide an attractive appearance to the apparatus of the invention. As indicated in FIG. 10L, side panel 118 has a first width B-1 and a first height B-2. As was the case with side panel 98, the drawer guide rail 100 is spaced-apart from the bottom 118c of the panel by a second distance B-3.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

I claim:

1. A foldable trolley for use in beauty salons for transporting articles from place to place comprising:
   (a) first and second side frames, each of said first and second side frames comprising:
      (i) a pair of spaced-apart, generally parallel tubular columns, each said column having an upper extremity and a lower extremity;
      (ii) a plurality of vertically spaced side panels connected to said pair of spaced-apart tubular columns; and
      (iii) a generally horizontally extending guide rail connected to each said side panel;
   (b) a first foldable link assembly foldably interconnecting said first and second side frames to permit movement thereof between a first operating position and a second folded position, said first foldable link assembly comprising first and second pivotally connected links, said first link being also pivotally connected to said first side frame and said second link being also pivotally connected to said second side frame;
   (c) a second foldable link assembly foldably interconnecting said first and second side frames to permit movement thereof between a first operating position and a second folded position, said second foldable link assembly comprising third and fourth pivotally connected links, said third link being also pivotally connected to said first side frame and said fourth link being also pivotally connected to said second side frame;
   (d) a molded plastic top member removably connected to said upper portions of said first and second side frames when said side frames are in said first operating position; and
   (e) a plurality of drawers disposed between said first and second side frames of said supporting structure when said side frames are in said first operating position, said drawers being slidable along said guide rails between a first retracted position and a second extended position.

2. The foldable trolley as defined in claim 1 further including an article support member connected to one of said tubular columns of one of said first and second side frames, said article support member having a plurality of spaced-apart apertures for removably supporting articles.

3. The foldable trolley as defined in claim 1, further including a caster rotatably connected to said lower extremity of each of said tubular columns of said first and second side frames.

4. The foldable trolley as defined in claim 1 in which each of said plurality of vertically spaced side panels includes a side wall, said side wall being provided with decorative indicia.

5. The foldable trolley as defined in claim 4 in which said decorative indicia comprises a multiplicity of spaced-apart protuberances.

6. The foldable trolley as defined in claim 4 in which said decorative indicia comprises a multiplicity of generally horizontally extending striations.

7. The foldable trolley as defined in claim 4 in which said decorative indicia comprises a multiplicity of spaced-apart, generally circular-shaped apertures.

8. A foldable trolley for use in beauty salons for transporting articles from place to place comprising:
   (a) first and second side frames, each of said first and second side frames comprising:
      (i) a pair of spaced-apart, generally parallel tubular columns, each said column having an upper extremity and a lower extremity;
      (ii) a plurality of vertically spaced side panels connected to said pair of spaced-apart tubular columns, each of said plurality of vertically spaced side panels having a side wall provided with decorative indicia; and
      (iii) a generally horizontally extending guide rail connected to each said side panel;
   (b) a first foldable link assembly foldably interconnecting said first and second side frames to permit movement thereof between a first operating position and a second folded position, said first foldable link assembly comprising first and second pivotally connected links, said first link being also pivotally connected to said first side frame and said second link being also pivotally connected to said second side frame;
   (c) a second foldable link assembly foldably interconnecting said first and second side frames to permit movement thereof between a first operating position and a second folded position, said second foldable link assembly comprising third and fourth pivotally connected links, said third link being also pivotally connected to said first side frame and said fourth link being also pivotally connected to said second side frame;
   (d) a molded plastic top member removably connected to said upper portions of said first and second side frames when said side frames are in said first operating position;
   (e) a plurality of drawers disposed between said first and second side frames of said supporting structure when said side frames are in said first operating position, said drawers being slidable along said guide rails between a first retracted position and a second extended position; and
   (f) an article support member pivotally connected to one of said tubular columns of one of said first and second side frames, said article support member having a plurality of spaced-apart apertures for removably supporting articles.

9. The foldable trolley as defined in claim 8, in which each of said plurality of vertically spaced side panels has a first height and a first width and article support member is generally oval in shape.

10. The foldable trolley as defined in claim 8, in which said article support member is generally rectangular in shape.

11. The foldable trolley as defined in claim 8 in which said decorative indicia comprises a multiplicity of spaced-apart protuberances.

12. The foldable trolley as defined in claim 8 in which side decorative indicia comprises a multiplicity of generally horizontally extending striations.

13. The foldable trolley as defined in claim 8, in which each of said plurality of vertically spaced side panels has a lower surface, a first height and a first width and in which said drawer guide rail is spaced-apart from said lower surface by a first distance.

14. The foldable trolley as defined in claim 8, in which each of said plurality of vertically spaced side panels has a lower surface, a first height and a first width and in which said drawer guide rail is spaced-apart from said lower surface by a second distance.

\* \* \* \* \*